United States Patent
Burgess

(10) Patent No.: US 8,525,943 B2
(45) Date of Patent: Sep. 3, 2013

(54) OPTICALLY ADDRESSED LIGHT VALVE

(75) Inventor: Christopher David Burgess, Salisbury (GB)

(73) Assignee: The Secretary of State for Defence in Her Brittanic Majesty's Government of the United Kingdom of Great Britain and Northern Ireland (GB)

( * ) Notice: Subject to any disclaimer, the term of this patent is extended or adjusted under 35 U.S.C. 154(b) by 0 days.

(21) Appl. No.: 13/382,937

(22) PCT Filed: Jul. 15, 2010

(86) PCT No.: PCT/GB2010/001349
§ 371 (c)(1),
(2), (4) Date: Jan. 9, 2012

(87) PCT Pub. No.: WO2011/007143
PCT Pub. Date: Jan. 20, 2011

(65) Prior Publication Data
US 2012/0099035 A1    Apr. 26, 2012

(30) Foreign Application Priority Data

Jul. 15, 2009   (GB) .................................. 0912241.7
Sep. 15, 2009   (GB) .................................. 0916089.6

(51) Int. Cl.
*G02F 1/135*    (2006.01)
(52) U.S. Cl.
USPC ........................................................... 349/25
(58) Field of Classification Search
USPC .............. 349/25, 27, 96, 101, 123, 126, 138, 349/179, 186, 192, 195, 28, 26; 359/246, 359/254
See application file for complete search history.

(56) References Cited

U.S. PATENT DOCUMENTS

| 4,726,660 | A  | 2/1988 | Rushford |
| H737      | H  | 2/1990 | Rushford |
| 5,227,902 | A  | 7/1993 | Takanashi et al. |
| 6,560,001 | B1 | 5/2003 | Igasaki et al. |
| 2012/0105773 | A1 | 5/2012 | Burgess |

FOREIGN PATENT DOCUMENTS

| FR | 2660447    | 10/1991 |
| FR | 2912230    | 8/2008  |
| GB | 2230346    | 10/1990 |
| GB | 2471949    | 4/2012  |
| GB | 2471950    | 4/2012  |
| JP | 08262483   | 11/1996 |
| WO | 03/073159  | 9/2003  |
| WO | 2005116719 | 12/2005 |
| WO | 2011007144 | 1/2011  |

OTHER PUBLICATIONS

International Search Report dated Oct. 25, 2010 in connection with International Patent Application PCT/GB2010/001349.
Search report dated Nov. 30, 2009 in connection with U.K. Patent Application No. 0916089.6.

(Continued)

*Primary Examiner* — Thoi Duong
(74) *Attorney, Agent, or Firm* — Dean W. Russell; Kristin M. Crall; Kilpatrick Townsend & Stockton LLP

(57) ABSTRACT

An optically addressed light valve suitable for selectively limiting the transmission of radiation from high intensity light sources independent of wavelength using a TN liquid crystal cell and a photoconductive material (vanadium doped silicon carbide).

7 Claims, 5 Drawing Sheets

(56) References Cited

OTHER PUBLICATIONS

Search Report dated Nov. 3, 2010 in connection with U.K. Patent Application No. 1011872.7.
C. James, et al., "Compact Silicon Carbide Switch for High Voltage Operation," Proceedings of the IEEE International Power Modulators and High Voltage Conference, New Jersey, May 27, 2008, pp. 17-20.
C. Longeaud, et al., "Characterization of defect levels in semi-insulating 6H-SiC by means of photoinduced transient spectroscopy and modulated photocurrent technique," Journal of Physics: Condensed Matter, Bristol, UK, vol. 21, No. 4, Jan. 28, 2009, p. 45801 (14 pages).
International Search Report dated Oct. 27, 2010 in Application No. PCT/GB2010/001350.
Search Report dated Dec. 2, 2009 in UK Application No. 0916102.7.

OPTICALLY ADDRESSED LIGHT VALVE

CROSS REFERENCE TO RELATED APPLICATIONS

This application is the U.S. national phase of International Application No. PCT/GB2010/001349 filed on Jul. 15, 2010, and published in English on Jan. 20, 2011, as International Publication No. WO 2011/007143 A1, which application claims priority to Great Britain Patent Application No. 0912241.7 filed on Jul. 15, 2009, and Great Britain Patent Application No. 0916089.6 filed on Sep. 15, 2009, the contents of all of which are incorporated herein by reference.

TECHNICAL FIELD OF THE INVENTION

This invention relates to an optically addressed light valve and more particularly to an optically addressed light valve suitable for selectively limiting the transmission of radiation from high intensity light sources independent of wavelength.

BACKGROUND TO THE INVENTION

Dazzle, by high intensity light sources, is a common problem in optical systems or imaging devices, causing damage to the sensor, degradation of image quality or loss of situational awareness for the user. The problem occurs when high intensity light sources such as sunlight, welding arc, car head lamps or lasers are directed at the system or device. Saturation or dazzle especially by laser is now a common problem, both in military and civilian environments, as lasers themselves have become smaller, cheaper and more readily available. This, in turn, has led to the need to provide such systems and devices with electro-optic protection measures (FORM) to limit or filter the transmission of light to the sensor. One approach to EOPM is to limit the effects of dazzle by spatial blocking using an optically addressed light valve (OALV).

One type of OALV works by coupling a photoresistor (PR) to a voltage dependent polarisation modulator, which may be a 90° twisted nematic, positioned between two polarizers. The polarizers may be set at predetermined angles relative to each other in order to remove a specific incoming wavelength. Both the PR and liquid crystal layer are situated between glass plates coated with transparent Indium Tin Oxide (ITO) to act as electrodes. A sinusoidal or square-wave voltage is applied to these ITO layers via wires attached using solid crystalline indium. The PR is a material whose bulk electrical conductivity can be altered by the presence of light. Typically photo-generated charges cause the resistivity to drop in response to light. In this way the voltage drop across the liquid crystal layer is determined by the intensity profile of light falling on the device.

One type of OALV incorporates a photoresistor fabricated from Bismuth Silicon Oxide (BSO). BSO has excellent photoconductive properties, including a high dark conductivity (conductivity in the absence of light), making it a perfect candidate for OALV's. However, BSO is itself optically active. This means that it causes a wavelength-dependent rotation of linearly polarized light passing through the crystal medium. This optical activity means that known BSO OALV's are effective at selectively limiting a single predetermined detrimental wavelength. Since different wavelengths are rotated by the PR by different amounts, the analysing polarizer needs to be set at a predetermined angle to block a specific incoming wavelength.

By incorporating a known OALV into an optical system or imaging device, such as a camera, night vision device, sight, safety goggles etc the sensor can be effectively protected from dazzle by one predetermined detrimental wavelength.

SUMMARY OF THE INVENTION

It is an object of the invention to provide an OALV adapted to spatially limit the transmission of radiation from high intensity light sources independent of wavelength.

Accordingly the present invention provides an optically addressed light valve (OALV) for limiting transmission of high intensity light comprising:
an input and an output polarizer;
a photoresistor layer and a voltage-dependent polarisation modulator both being sandwiched between first and second transparent electrodes;
wherein the photoresistor layer comprises an optically inactive material.

Replacing a known optically active photoresistor material such as BSO with an optically inactive photoresistor material ensures that the photoresistor does not contribute to the polarisation of incoming light and permits the OALV to be used to limit the transmission of radiation from high intensity light sources independent of wavelength. In other words, an OALV in accordance with the invention can be used to protect sensors from broadband (i.e. white light) and monochromatic sources. This covers both green and red type lasers as well as other light wave forms such as direct sunlight. One suitable optically inactive photoresistor material is vanadium-doped silicon carbide (V-SiC) although other equivalent materials will be apparent to the person skilled in the art.

It should be noted that the invention is applicable to any high intensity light source including ultraviolet and infra-red.

In one embodiment the first transparent electrode comprises an indium tin oxide (ITO) coated glass plate, and the second transparent electrode comprises an indium tin oxide (ITO) coating on the outer surface of the photoresistor layer.

Alternatively the first and second transparent electrodes may both conveniently comprise indium tin oxide (ITO) coated glass plates, although equivalent arrangements are known in the art.

The voltage-dependent polarisation modulator preferably comprises a twisted nematic layer formed within a layer of liquid crystal. This can be formed by the application of uni-directionally rubbed polymer coatings adjacent to the two major faces of the liquid crystal layer. The local liquid crystal orientation is determined by the rubbing direction of the adjacent polymer layer, so that, if the rubbing directions are orthogonal, for example, a 90 degree helical liquid crystal structure is established through the thickness of the liquid crystal layer.

If the input and output polarizers are crossed the device will not be transmissive to high intensity light, whilst low level light is transmitted unaffected by the device.

By positioning an OALV in accordance with the invention at or near a focal plane of an optical system or imaging device, high intensity incident light is focused to a point on the OALV. Therefore, the device will block only the focused point of dazzle allowing the user to view the remainder of the image clearly.

BRIEF DESCRIPTION OF THE DRAWINGS

In order that the invention might be more fully understood, embodiments thereof will now be described, with reference to the accompanying drawings, in which.

DETAILED DESCRIPTION

Figure 1:
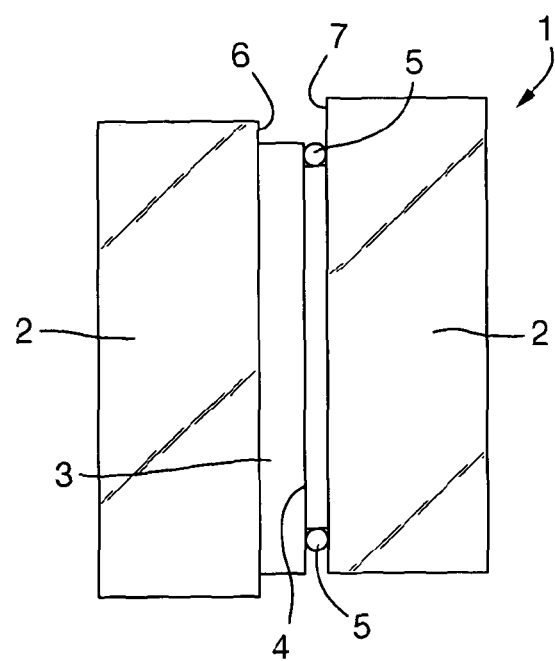
FIG. 1 illustrates a standard OALV design.

FIG. 1 illustrates a standard OALV design 1. Two glass plates are coated with transparent Indium Tin Oxide (ITO), to provide glass electrodes 2. A photoresistor 3 is coupled to a liquid crystal layer 4, with spacers 5 positioned to form a gap into which the liquid crystal is tilled by capillary action. The glass electrodes 2 are electrically connected to a voltage 6 and to earth 7. These electrical connections 6 and 7 allow a sinusoidal or square wave voltage to be applied across the glass electrodes 2. These glass electrodes 2 are spin coated with a polymer layer and rubbed unidirectionally such that the local liquid crystal layer 4 orientation is determined by the rubbing direction. By constructing the device such that the two rubbing directions are orthogonal, a 90 degree helical structure is set up within the liquid crystal layer 4. This is known as a twisted nematic. Twisted nematic layers are voltage-dependent polarisation modulators.

Figure 2:
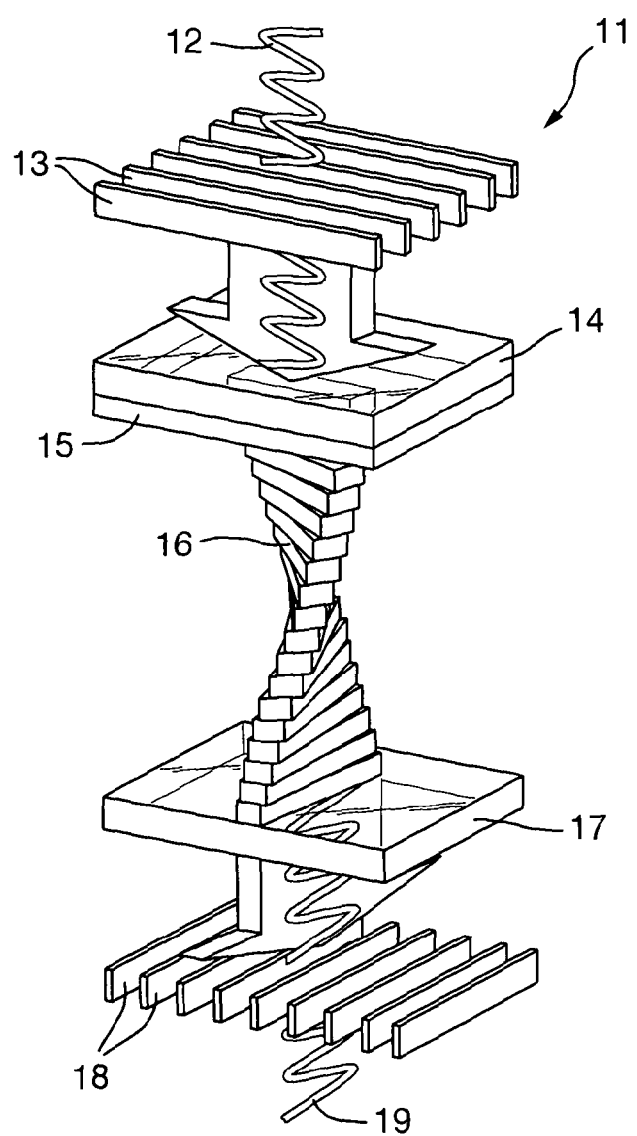
FIG. 2 illustrates the helical structure of a twisted nematic layer used for polarisation modulation.

FIG. 2 illustrates the effect of a twisted nematic layer 16 arranged between crossed polarizers 13, 18 in an OALV assembly 11. Low intensity light 12 enters into the OALV assembly 11 through input linear polarizer 13. The low intensity light 12 travels through the ITO coated glass electrode 14. As the light propagates through the twisted nematic layer 16 its direction of polarization is rotated along with the twisted nematic helix. The total twist angle of the twisted nematic layer 16 is 90 degrees. Therefore, since the total twist angle matches the angle between the crossed polarizers 13, 18 the low intensity light 19 is transmitted by the output linear polarizer 18. If high intensity light is incident on the device, photoconduction causes a local drop in the resistivity of the PR 15 and an associated increase in the electric field strength within the liquid crystal layer. This electric field causes the breakdown of the helical structure of the twisted nematic layer 16, switching off its twisting effect. Therefore, such high intensity light is not rotated like low intensity light, and is absorbed by the output linear polarizer 18.

Figure 3A:
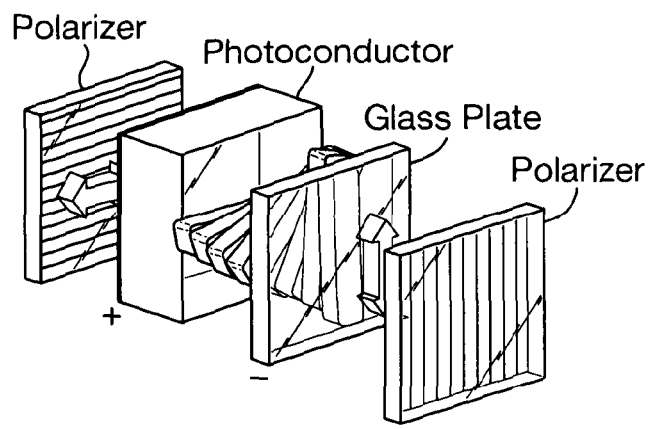
FIG. 3 illustrates the nonlinear effect of a standard OALV.
Figure 3A:
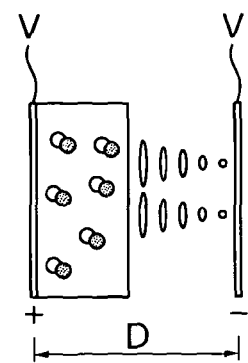
Figure 3B:
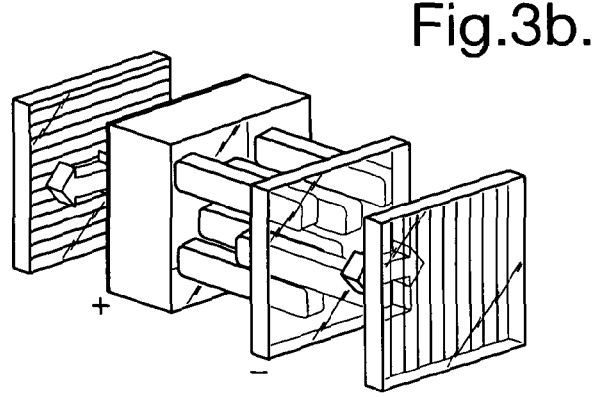
Figure 3B:
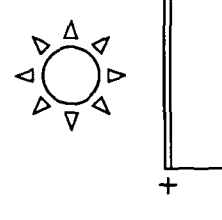
Figure 3B:
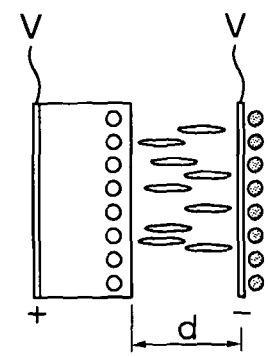

FIG. 3a illustrates the nonlinear effect of a standard OALV when the liquid crystal is in the off state i.e. it is fully transparent. FIG. 3b illustrates the effect when the liquid crystal is in the on state i.e. it is opaque to a predetermined wavelength of laser light.

Figure 4:
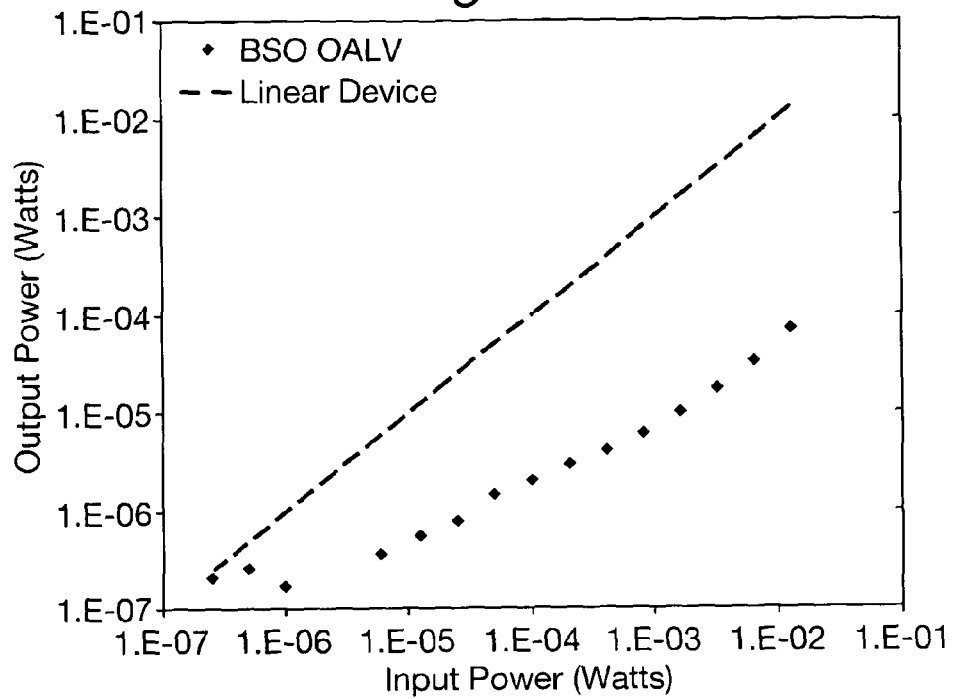
FIG. 4 shows the nonlinear response of a BSO OALV.

Since an OALV is a nonlinear optical device, its function can be characterised by a power scan measurement, in which the transmitted energy of the device is measured as the input energy is varied. A linear device (such as a plate of glass or an absorbing filter) will always transmit some fixed fraction of the input light, such that the output energy is a linear function of the input energy, whereas transmission by a nonlinear device will vary with input energy. FIG. 4 shows the nonlinear response of a standard BSO OALV compared to that of a linear device. The deviation from the linear response illustrates the effectiveness of the BSO OALV as an optical switch. In FIG. 4 the effects of absorption in the PR and polarizers have been removed.

Figure 5:
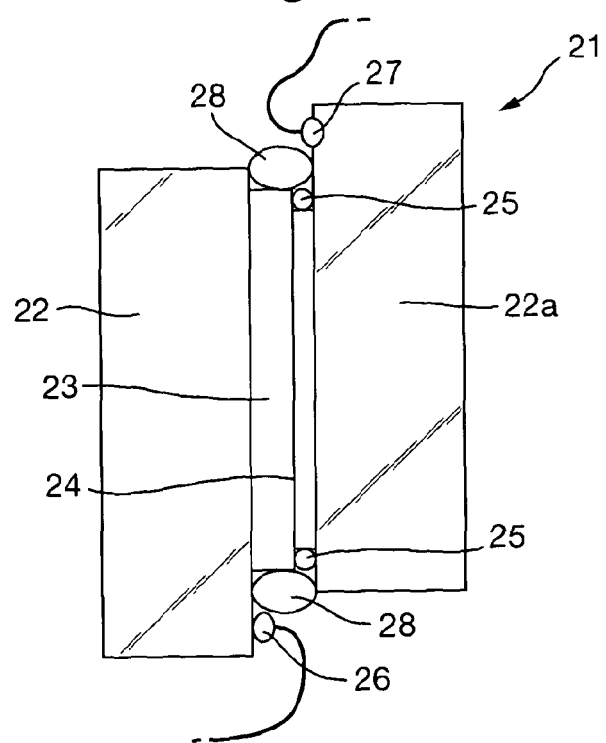
FIG. 5 illustrates an OALV in accordance with the invention (polarizers not shown)

The applicant has successfully built a device in which the BSO PR has been replaced by a crystal of V-SiC. FIG. 5 illustrates an embodiment of the V-SiC OALV in accordance with the invention as an assembly 21 (polarisers are not shown). In common with Figure 1 this embodiment comprises glass electrodes 22, 22a, a photoresistor (PR) 23, a liquid crystal layer 24, spacers 25, electrical connection 26 which connects to a voltage and electrical connection 27 which connects to ground. In this embodiment the photoresistor (PR) 23 is constructed of vanadium-doped silicon carbide instead of BSO.

The device was constructed in accordance with the following description. Glass electrodes 22, 22a were plates of Indium Tin Oxide (ITO) coated BK7 glass obtained from IngCrys Laser Systems Ltd. The PR 23 was a 25×25×1 mm V-SiC wafer cut from material obtained from II-VI Semiconductors Deutschland. The V-SiC PR 23 was then optically polished on both 25×25 mm faces. An alignment layer of polyimide dissolved in methanol was then spin-coated onto one face of the V-SiC PR 23 as well as one face of glass electrode 22a. These polyimide layers were then rubbed using a velour cloth. The V-SiC PR 23 was placed onto glass electrode 22 such that its non-coated face was in contact with the ITO and there was no gap between the glass electrode 22 and the V-SiC PR 23. Spacer balls 25 (12 micron glass beads) were then applied to the surface of the V-SiC PR 23 and the second glass electrode 22a was placed onto the V-SiC PR 23 such that its polyimide coated face was in contact with the spacers 25. The rubbing direction applied to the polyimide coating on the face of glass electrode 22a must be orthogonal to the rubbing direction applied to the polyimide layer on the V-SiC PR 23. The gap between the V-SiC PR 23 and the glass electrode 22a was then filled with liquid crystal 24 via capillary action. Once filled, the device was sealed around the edges using glue 28 and electrical wires 26, 27 were soldered onto the ITO surfaces. In an alternative embodiment the glass electrode 22 is replaced with an ITO coating applied to the outer surface of the BSO PR layer 23, which is the opposite side to where the BSO PR layer 23 makes contact with the liquid crystal 24.

Figure 6:
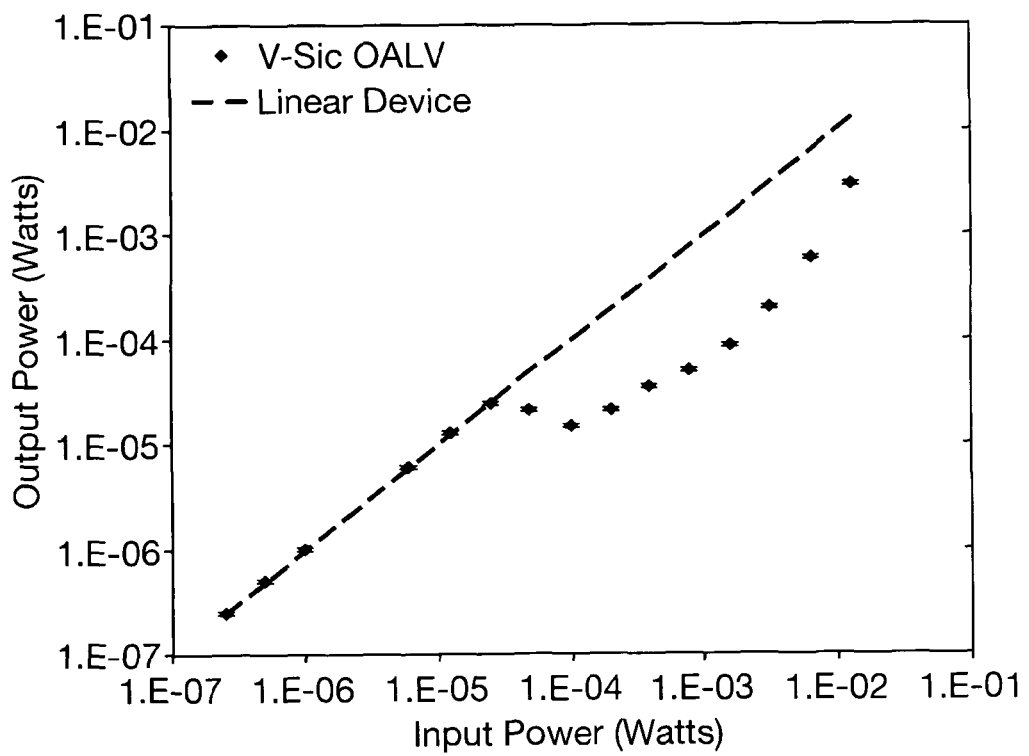
FIG. 6 shows the nonlinear optical response of a V-SiC OALV.

FIG. 6 shows the nonlinear optical response of the experimental V-SiC OALV device. The transmission of a device is given by the ratio of the outputted energy to the inputted energy. If the transmission of a device changes with intensity, that device is nonlinear. Specifically, if a device is transmissive to low intensity and less transmissive to high intensity, that device can be considered to function as an optical switch. The dashed line plots the response of a linear device (the effects of absorption have been taken into account). The departure of the experimental points (diamonds) from the linear response (dashed line) demonstrates that the device is behaving as an optical switch.

If the input and output polarizers are crossed and the device is situated substantially at the focal plane of an optical system or imaging device, a high intensity incident light source of any in band wavelength will be focused to a small point on the OALV. The high intensity light causes the device to be less transmissive in the locality of the focused dazzle, whilst maintaining imaging capability across the remainder of the field of view.

The invention claimed is:

1. An optically addressed light valve (OALV) for limiting transmission of high intensity light comprising:
   an input and an output polarizer;
   a single photoresistor layer and a voltage-dependent polarisation modulator both being sandwiched between first and second transparent electrodes;
   wherein the photoresistor layer comprises an optically transmissive inactive material across broadband and monochromatic wavelengths, including green and red lasers, direct sunlight, and high intensity light sources including ultraviolet and infrared.

2. An OALV as claimed in claim 1 wherein the photoresistor layer comprises vanadium-doped silicon carbide (V-SiC).

3. An OALV as claimed in claim 1 wherein the first transparent electrode comprises indium tin oxide (ITO) coated glass and the second transparent electrode comprises an indium tin oxide (ITO) coating on the photoresistor layer.

4. An OALV as claimed in claim 1 wherein the first and second transparent electrodes comprise indium tin oxide (ITO) coated glass plates.

5. An OALV as claimed in claim 1 wherein the voltage-dependent polarisation modulator comprises a 90° twisted nematic layer formed within a layer of liquid crystal.

6. An OALV as claimed in claim 1 wherein the input and output polarizers are crossed.

7. An optical system or imaging device comprising an OALV as claimed in claim 1 positioned at or near a focal plane so that an image can be formed on the OALV.

* * * * *